Dec. 6, 1938.  E. M. MENSENDICCK ET AL  2,139,028

SEAT

Filed Sept. 29, 1937  4 Sheets-Sheet 1

Elizabeth M. Mensendieck and
Olaf Utne
INVENTOR

BY
Pennie Davis Marvin & Edmonds
ATTORNEYS

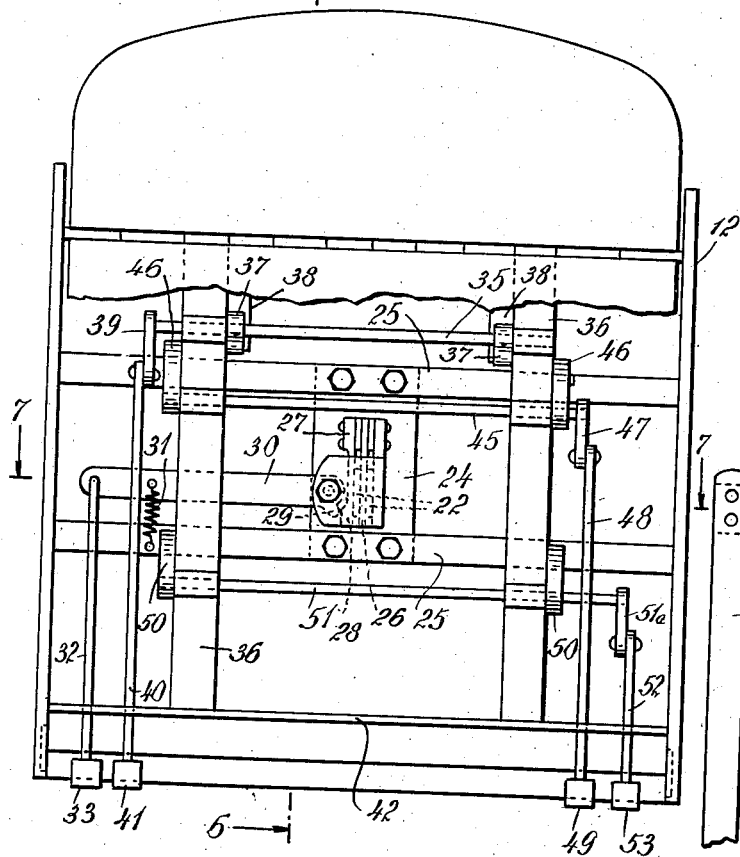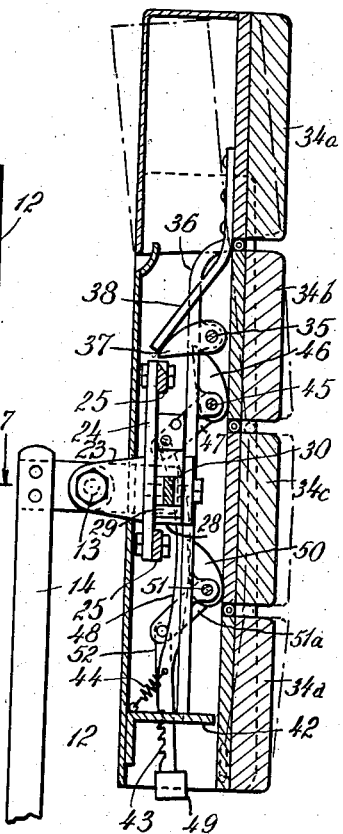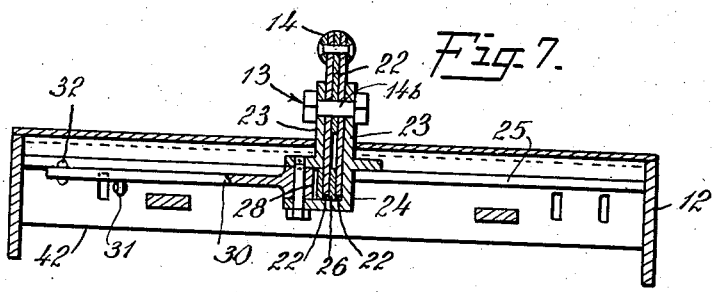

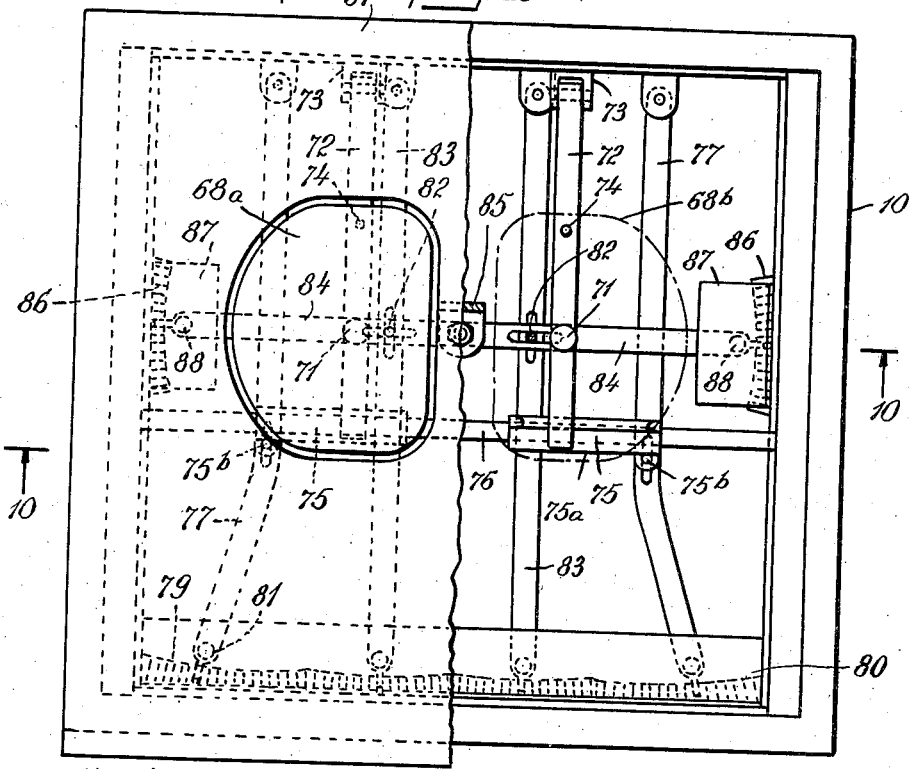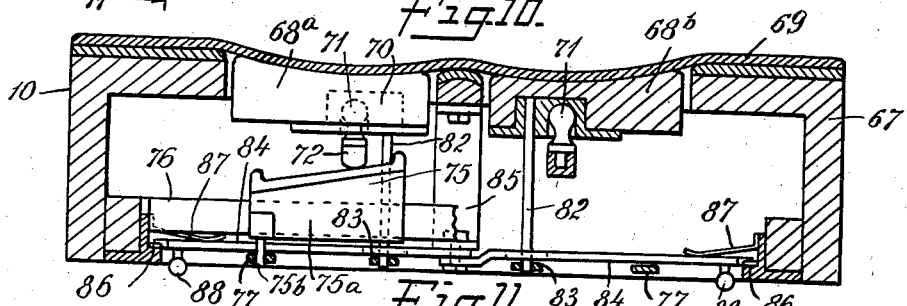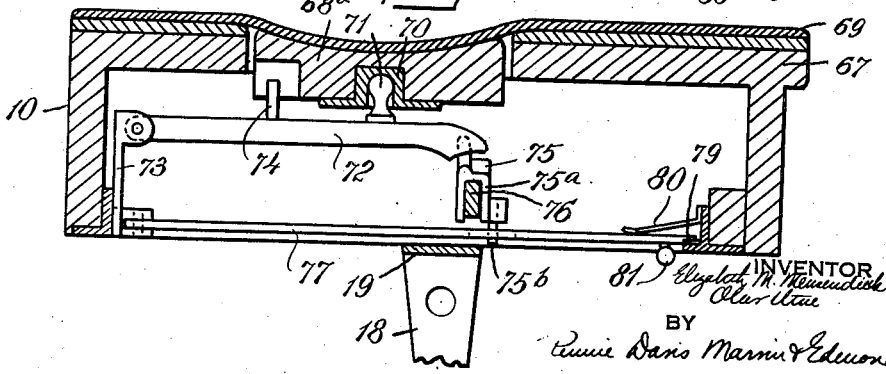

Dec. 6, 1938.   E. M. MENSENDICCK ET AL   2,139,028
SEAT
Filed Sept. 29, 1937   4 Sheets-Sheet 4
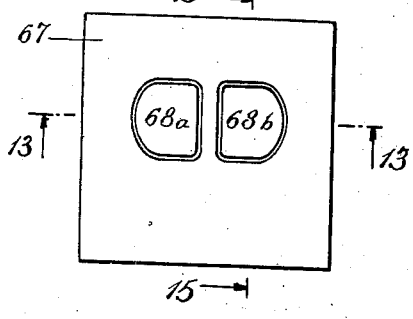
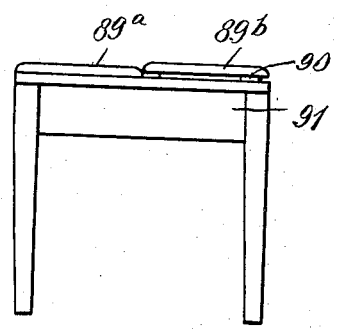
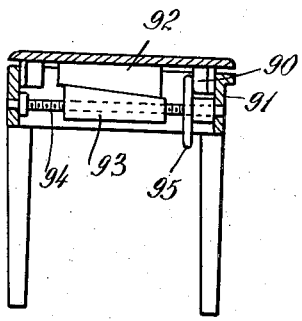
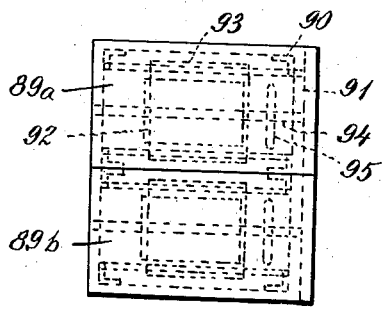
INVENTOR
BY
ATTORNEYS Patented Dec. 6, 1938

2,139,028

UNITED STATES PATENT OFFICE 2,139,028

SEAT

Elizabeth M. Mensendieck and Olav Utne, New York, N. Y.

Application September 29, 1937, Serial No. 166,268

12 Claims. (Cl. 155—28)

This invention relates to chairs, and is concerned more particularly with a chair of novel construction having movable parts which may be adjusted to provide supporting surfaces conforming to the shape of the body of the occupant. The new chair may, accordingly, be used advantageously for remedial purposes, as, for example, in the correction of incorrect posture resulting from skeletal displacement caused by fatigue, and also for instruction as to correct posture.

The objects of the invention are attained in the new chair by forming the chair seat of a plurality of independently adjustable parts which provide support for the bones lying at the lower end of the trunk, by mounting the back adjustably relative to the seat and constructing it of a plurality of parts which may be independently adjusted, and by providing movable arm-rests capable of being secured in various positions.

For a better understanding of the invention, reference may be had to the accompanying drawings, in which:

Figure 5 is a front elevational view of the back with parts broken away;

Figure 6 is a sectional view on the line 6—6 of Figure 5;

Figure 7 is a sectional view on the line 7—7 of Figure 5.

Figure 8 is an elevational view, partly in section, of a detail;

Figure 9 is a plan view of the seat with parts broken away;

Figures 10 and 11 are sectional views on the lines 10—10 and 11—11, respectively, of Figure 9;

Figure 12 is a plan view of the seat;

Figures 13 and 14 are sectional views on the line 13—13 of Figure 12, showing the parts in different positions of adjustment;

Figure 15 is a sectional view on the line 15—15 of Figure 12;

Figure 16 is a front elevational view of another form of seat;

Figure 17 is a side elevational view of the seat shown in Figure 16; and

Figure 18 is a plan view, partly in section, of the seat of Figure 16.

Figure 1:
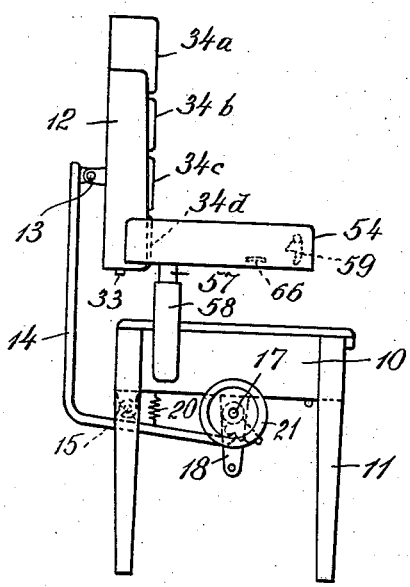
Figure 1 is a side elevational view of the new chair.
Figure 2:
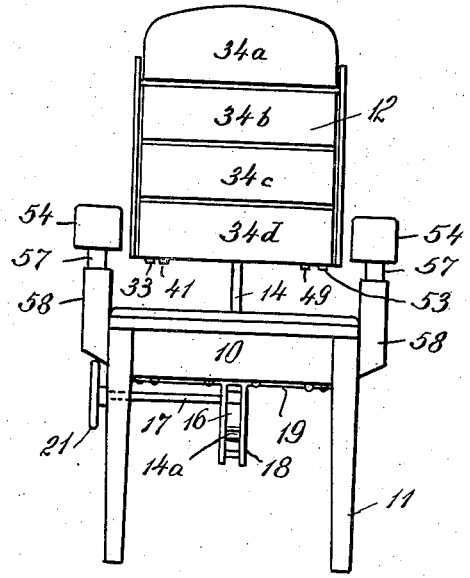
Figure 2 is a front elevational view.
Figure 3:
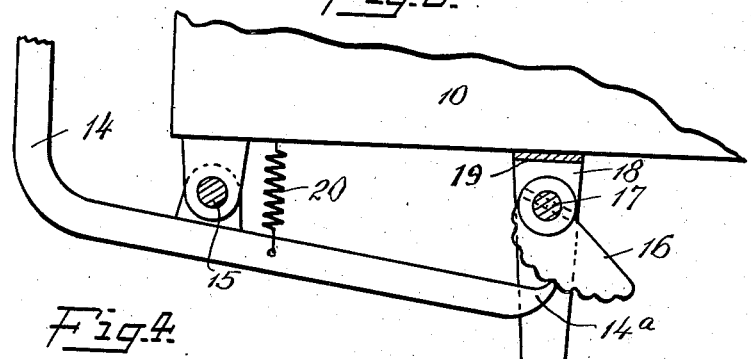
Figure 3 is a view of a detail.
Figure 4:
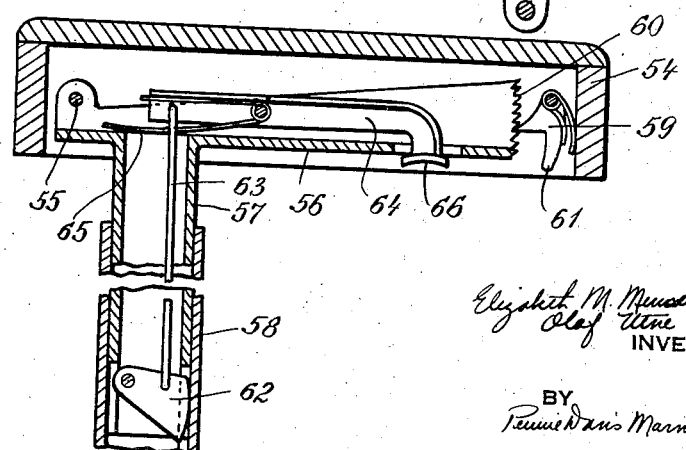
Figure 4 is a longitudinal sectional view of one of the arm-rests.

In the embodiment of the invention illustrated in Figure 1, the chair, which is preferably made of wood or other hard surface material, includes a seat 10 mounted on supporting means, such as legs 11, and a back 12 pivotally mounted at 13 on a lever 14 pivoted on the seat at 15.

The lever may be swung on its pivot to move the back forward and to the rear, and may be held in adjusted position. For these purposes, the end 14a of the lever is formed as a pawl which engages the teeth on a ratchet 16 fast on a shaft 17 mounted in brackets 18 depending from a cross-bar 19 attached to the bottom of the seat. The pawl is held in contact with the ratchet by a spring 20 attached to the lever and to the seat, and the shaft is provided with a hand wheel 21 by which the ratchet may be shifted to permit the lever to be swung to change the inclination of the back.

The position of the back relative to the lever may be changed by swinging the back on the pivot 13 and the back may be held in the desired position of adjustment by any suitable means. In the chair illustrated a plurality of plates 22, here shown as three in number, are rigidly connected to the lever 14 and enter between spaced arms 23 of a fitting 24 secured to cross-bars 25 of the back. A pivot pin 14b passes through the arms 23 and through plates 22. The forward end of the middle plate 22 is cut away and a plate 26 secured to the fitting by a rivet shown in Figure 8 lies in the space between the free ends of the outer plates 22. A plate 27 secured to the fitting 24 in contact with the outer surface of the free end of one of the plates 22, is provided with a lug 28 at its free end against which bears a stud 29 on a lever 30 pivoted on fitting 24. The lever is acted on by a spring 31 connected at one end to the lever and at the other end to a cross-bar 25, and the spring tends to move the lever so that its stud 29 bears against lug 28 on plate 27, the action of the lever forcing the plates 26 and 27 rigid with the back against plates 22 rigid with the lever 14 and thus the mechanism serves as a clamp for holding the back in proper angularly adjusted position relative to lever 14. The lever may be swung against the spring to release the clamp by means of a rod 32 extending down through the back and provided with an operating button 33 at its lower end.

The back in the chair shown is subdivided into four sections, 34a, 34b, 34c and 34d, the sections lying one above another with adjacent sections hinged together and the position of each of the sections 34a, 34b and 34c is adjustable by separate and independent mechanism hereinafter described. The hinge member connecting the sections 34a and 34b is pivotally connected to the frame members 12 at each side of the back, and the remainder of the sections swing free, the positions of which are adjusted by the occupant of the chair. The mechanism for adjusting section 34a and holding it in adjusted position, comprises a shaft 35 mounted in suitable bearings on frame members 36 of the back, the shaft being provided with cams 37 which bear against arms 38 attached to section 34a and extending therefrom at an angle. Fast on the shaft is a crank arm 39 to the end of which is connected a rod 40 extending vertically through the back of the chair and provided with an operating button 41 at its lower end. The rod passes through a horizontal partition 42 and its rear edge is provided with teeth 43 engageable with the edge of the opening in the partition. Normally, the rod is held by a spring 44 with one of its teeth overlying the edge of the opening in the partition and the position of the rod determines the position of the cams 37 and of section 34a.

The position of sections 34b and 34c is controlled in a similar manner. To the rear of section 34b is a shaft 45 mounted in bearings on the frame members 36 and carrying cams 46 which bear on the rear surface of the section. The shaft is provided with a crank 47 to which is connected a rod 48 having an operating button 49 at its lower end, and the rod passes through partition 42 and is provided with teeth by which the rod may engage the partition so that the rod may be held in any desired position. The position of the rod determines the angular position of shaft 45 and this in turn determines the operation of the cams 46 and of the section 34b. Section 34c is adjusted by means of a similar shaft 51 provided with cams 50 and operated by means of a crank 51a to which is connected a rod 52 having an operating button 53. By manipulation of the rods 40, 48 and 52, the relative positions of the several sections may be adjusted so that their forward surfaces provide the desired contact for the occupant of the chair.

The chair is provided with adjustable arm-rests which may be raised and lowered and adjusted angularly. Each arm-rest includes a top 54 pivotally mounted at 55 on a supporting member 56 having a stem 57 which enters a tubular support 58 attached to one side of the seat. The top is provided with a spring pressed pawl 59 which engages ratchet teeth 60 at the end of the supporting member 56, the pawl having an operating tail 61. By releasing the pawl, the top may be angularly adjusted about pivot 55 and then held in adjusted position by re-engagement of the pawl with the ratchet.

The arm-rest is held in any desired vertical position by means of a wedge member 62 pivotally mounted within the stem 57 and having a portion lying within a slot in the stem. This wedge member is operated by means of a rod 63 which extends up through the stem and is connected to one end of a lever 64 pivoted on the supporting member 56 and acted on by the spring 65. The lever 64 has an end 66 which extends downward through an opening in the member 56 and provides a convenient means for operating the lever. By swinging lever 64 on its pivot, the wedge member 62, which normally makes contact through the slot in stem 57 with the inner surface of the tubular member 58, can be released therefrom and the arm-rest raised or lowered to the desired position. By swinging the lever in the opposite direction the wedge member will be forced into contact with the tubular member 58 so as to secure the arm-rest in the desired position of adjustment.

The seat of the chair is provided with movable sections with which the bones at the lower end of the trunk make contact and by adjusting the relative positions of these sections, the desired kind of support for the trunk may be afforded.

In the construction illustrated, the seat includes a main body 67 having openings at its top in which are disposed the movable sections 68a, 68b, these sections being covered by a layer 69 of any suitable material such as felt, rubber sponge and the like. These sections are mounted so that they may be raised and lowered and tilted both lengthwise and crosswise of the seat. As the mechanism for this purpose is duplicated for the two sections, it will be described in connection with one section only.

Attached to the underside of section 68a is a block 70 having a recess for a ball 71 attached to a lever 72 mounted on a horizontal pivot in the fitting 73 attached to the body of the seat. The lever 72 has a pin 74 entering a slot in the section and lying between the ball and the pivot point, and the free end of the lever rests upon the inclined surface of a plate 75 formed with spaced arms 75a and mounted to straddle a rod 76 extending across the bottom from one side to the other. The plate 75 is provided with a downwardly extending pin 75b which lies within a slot in a lever 77 pivotally attached to the body of the seat and adapted to be swung in a horizontal plane. The free end of lever 77 rests upon a corrugated plate 79 attached to the seat along the wall opposite to that on which lever 77 is pivoted, and adjacent the free end of the lever is an operating button 81 attached to its underside. The free end of the lever 77 is held in place upon the plate 79 by a spring 80 bearing downwardly upon the lever. By movement of the lever the position of the plate 75 may be changed relative to its supporting bar 76 and thereby the lever 72 will be raised or lowered so as to raise or lower section 68a.

Mounted fast in a socket in the block 70 is a downwardly extending rod 82, the lower end of which lies within slots in levers 83 and 84. The lever 83 is pivoted on the body of the seat for horizontal swinging movement and its free end rests upon the corrugated plate 79, the lever being provided with a suitable operating button on its under surface. Lever 84 is pivoted for horizontal swinging movement on bracket 85 which is suitably mounted at the center of the body of the seat and extends at right angles to lever 83, lever 84 having its free end supported on a corrugated plate 86 and having a spring 87 which holds the end of the lever in contact with the plate. The lever is also provided with an operating button 88 near its free end.

When the section 68a is to be tilted in one way or another, the appropriate lever 83, 84 is swung and this causes the lower end of rod 82 to be swung accordingly. The section then tilts about its ball support 71 and is held in the desired position by the insertion of the free end of the lever in a corrugation in one of the plates 79, 86.

The various positions of adjustment of the sections 68a, 68b which can be obtained by the mechanism described are illustrated in Figures 13, 14 and 15. In Figure 13 both sections are substantially horizontal with one higher than the other. In Figure 14 the sections are shown as lowered below the plane of the top of the seat and tilted so that their outer edges are lower than the inner edges. Figure 15 illustrates the adjustment of one section in which its front edge is lower than its rear edge.

In Figures 16, 17 and 18 there is illustrated a modified form of seat in which the entire top is formed of two sections 89a, 89b which may be raised or lowered independently of one another. Each of the sections is provided with corner flanges 90 depending from its under surface and lying within the walls 91 of the body of the seat. Extending downward from each section is a wedge block 92 resting upon a similar block 93 through which is threaded a shaft 94 mounted in suitable bearings in opposite walls 91. The shaft is provided with a hand wheel 95 and by rotation of the shaft, the wedge block 93 may be moved lengthwise of it and this serves to raise or lower the seat section with which it is associated.

The new chair, as described, may be employed for various remedial purposes. Thus, it may be used for the correction of improper posture resulting from skeletal displacement caused by fatigue, and it may also be employed for instruction. By adjustment of the back sections, the back may be caused to provide a supporting surface conformed to the shape of the body of the occupant and affording a support throughout the length of the spine. Adjustment of the seat sections makes it possible to provide the desired support for the bones at the bottom of the trunk and an adjustment of the arm-rests permits them to be placed in the position most comfortable for the occupant.

We claim:

1. A chair comprising supporting means, a seat mounted on said supporting means, said seat having a pair of portions movable relative to the rest of the seat and having their upper surfaces concave, said movable portions being disposed in those parts of the seat which normally underlie the pelvis bones of an occupant of the chair.

2. A chair comprising supporting means, a seat mounted on said supporting means, said seat having a pair of portions movable relative to the rest of the seat and having their upper surfaces concave, said movable portions being disposed in those parts of the seat which normally underlie the pelvis bones of an occupant of the chair, and means for raising and lowering said relatively movable portions.

3. A chair comprising supporting means, a seat mounted on said supporting means, said seat having a pair of pivotally mounted portions, the upper surfaces of which are concave, said pivotally mounted portions being disposed in those parts of the seat which normally underlie the pelvis bones of an occupant of the chair, and means for tilting said portions relative to the rest of the seat.

4. A chair comprising supporting means, a seat mounted on said supporting means, said seat having a pair of pivotally mounted portions, the upper surfaces of which are concave, said pivotally mounted portions being disposed in those parts of the seat which normally underlie the pelvis bones of an occupant of the chair, means for independently tilting said pivotally mounted portions relative to the rest of the seat, and means for raising and lowering said pivotally mounted portions.

5. A chair comprising supporting means, a seat mounted on said supporting means, said seat having a pair of portions movable relative to the rest of the seat and having their upper surfaces concave, said movable portions being disposed in those parts of the seat which normally underlie the pelvis bones of an occupant of the chair, and a back connected to the seat and including a frame member and a plurality of sections adjustably supported thereby.

6. A chair comprising supporting means, a seat mounted on said supporting means, said seat having a pair of portions movable relative to the rest of the seat and having their upper surfaces concave, said movable portions being disposed in those parts of the seat which normally underlie the pelvis bones of an occupant of the chair, a lever connected to the seat, a back mounted on said lever and including a frame member and a plurality of sections adjustably supported thereby.

7. A chair comprising supporting means, a seat mounted on said supporting means, said seat having a pair of portions movable relative to the rest of the seat and having their upper surfaces concave, said movable portions being disposed in those parts of the seat which normally underlie the pelvis bones of an occupant of the chair, a lever pivotally connected to the seat, means for adjusting the position of the lever relative to the seat, and a back mounted on said lever.

8. A chair comprising supporting means, a seat mounted on said supporting means, said seat having a pair of portions movable relative to the rest of the seat and having their upper surfaces concave, said movable portions being disposed in those parts of the seat which normally underlie the pelvis bones of an occupant of the chair, a lever pivotally connected to the seat, means for adjusting the position of the lever relative to the seat, a back mounted on said lever, and means for holding the back in adjusted position relative to the lever.

9. A chair comprising supporting means, a seat mounted on said supporting means, said seat having a pair of portions movable relative to the rest of the seat and having their upper surfaces concave, said movable portions being disposed in those parts of the seat which normally underlie the pelvis bones of an occupant of the chair, a back connected to the seat and including a frame member and a plurality of sections adjustably supported thereby, and means for adjusting the relative positions of said sections.

10. A chair comprising supporting means, a seat mounted on said supporting means, said seat having a pair of portions movable relative to the rest of the seat and having their upper surfaces concave, said movable portions being disposed in those parts of the seat which normally underlie the pelvis bones of an occupant of the chair, and a back connected to the seat and including a frame member and a plurality of hingedly connected sections supported thereby, and means for relatively adjusting said sections with respect to one another.

11. A chair comprising supporting means, a seat mounted on said supporting means, said seat having a pair of portions movable relative to the rest of the seat and having their upper surfaces concave, said movable portions being disposed in those parts of the seat which normally underlie the pelvis bones of an occupant of the chair, a back adjustable relative to the seat, a pair of arm rests mounted on the chair and movable relative thereto, and means for adjusting the position of said arm rests.

12. A chair comprising supporting means, a seat mounted on said supporting means, said seat having a pair of portions movable relative to the rest of the seat and having their upper surfaces concave, said movable portions being disposed in those parts of the seat which normally underlie the pelvis bones of an occupant of the chair, a back adjustable relative to the seat and including a frame member and a plurality of sections adjustably supported thereby, a pair of pivotally mounted arm rests mounted on the chair and movable vertically, and means for adjusting the position of the arm rests about their pivotal mounting.

ELIZABETH M. MENSENDICCK.
OLAV UTNE.